United States Patent

[11] 3,545,471

[72] Inventor John F. Taplin
 15 Sewall St., West Newton, Massachusetts 02165
[21] Appl. No. 829,204
[22] Filed June 2, 1969
[45] Patented Dec. 8, 1970

[54] PRESSURE REGULATOR
 10 Claims, 3 Drawing Figs.
[52] U.S. Cl............................................. 137/116.5, 137/484.8, 137/505.18, 137/505.34, 137/505.37
[51] Int. Cl............................................. G05d 16/06
[50] Field of Search.................................. 137/116.5, 484.8, 505.18, 505.34, 505.37

[56] References Cited
UNITED STATES PATENTS

| 2,707,966 | 5/1955 | Taplin | 137/505.18 |
| 2,806,481 | 9/1957 | Faust | 137/484.8 |
| 2,831,494 | 4/1958 | Taplin | 137/484.8 |

Primary Examiner—William F. O'Dea
Assistant Examiner—William H. Wright
Attorney—Erwin Salzer ABSTRACT: An improvement of the pressure regulator disclosed in U.S. Pat. No. 2,707,966 to John F. Taplin, May 10, 1955 for PRESSURE REGULATOR VALVE having substantially the same performance characteristic as that pressure regulator valve but being made up of considerably fewer parts, involving considerably smaller cost of manufacture, and having a significantly smaller bulk. The improvement consists, in essence, in a single means performing the dual function of establishing a fluid passage for venting fluid from the outflow passage of the device to reduce excess pressure therein and of establishing a mechanical tie between a pressure relief pintle and a pressure supply pintle.

PATENTED DEC 8 1970
3,545,471
Fig.1.
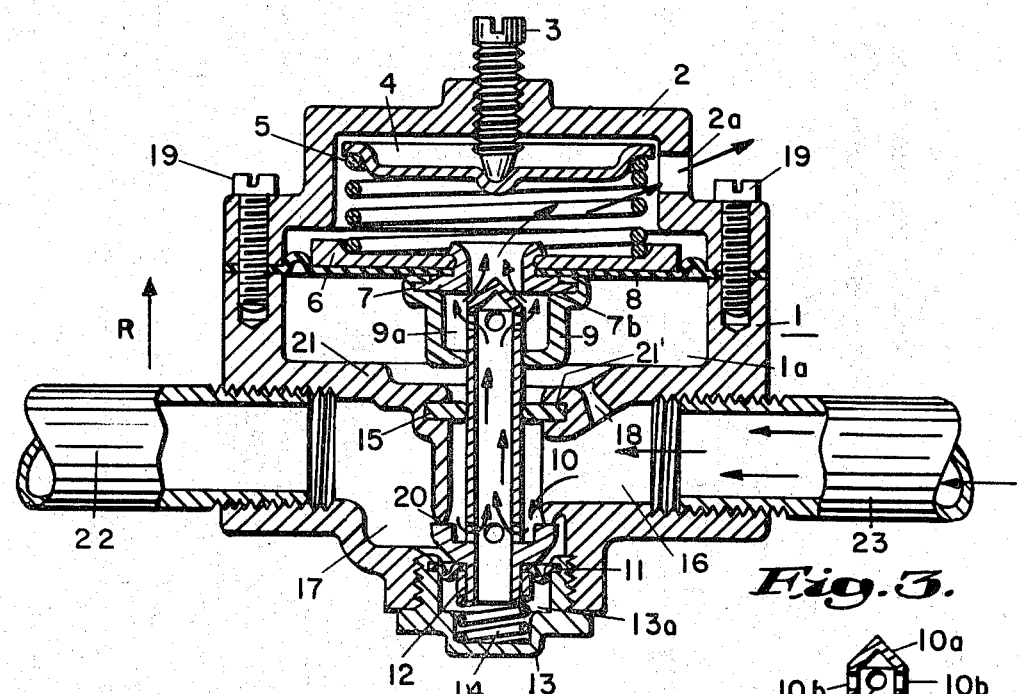
Fig.3.
Fig.2.
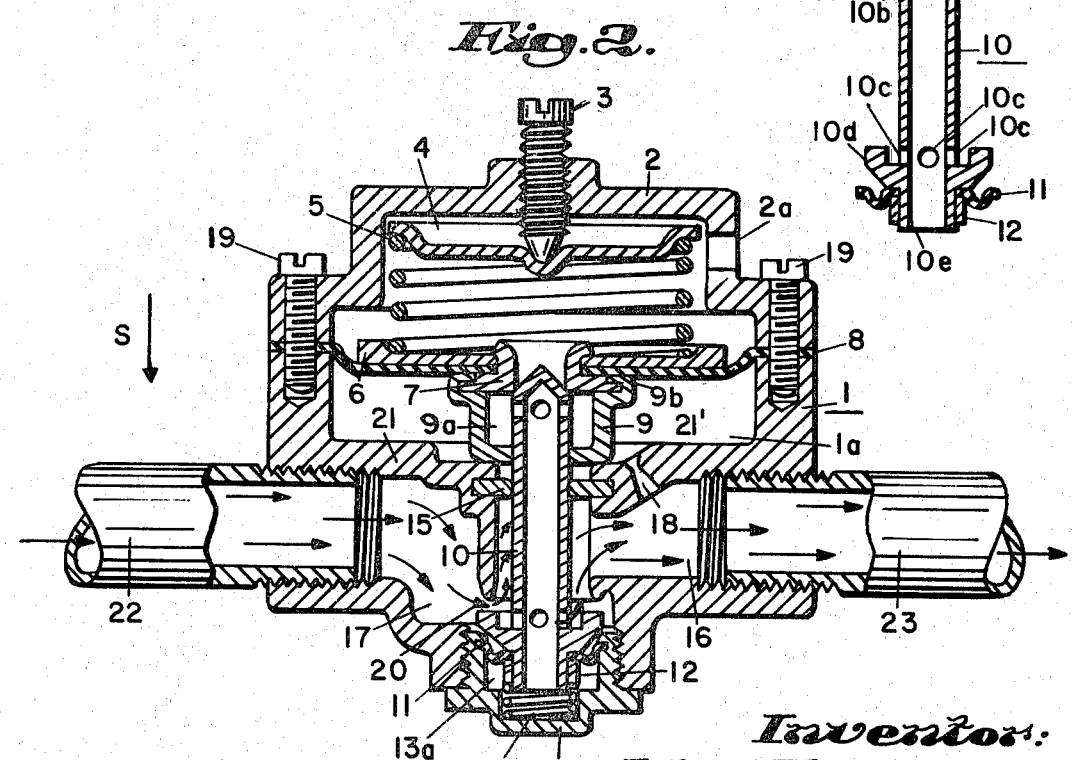
Inventor:
John F. Taplin,
by
Attorney 3,545,471

PRESSURE REGULATOR

BACKGROUND OF THE INVENTION

The desirable performance characteristics of pressure regulators according to U.S. Pat. No. 2,707,966 and according to the present invention are fully stated in the above patent, and reference may be had to the same in regard to this aspect of the present invention.

The structure disclosed in the above patent includes mechanical tie means between a relief valve pintle 29 and a supply valve pintle 20. these tie means including a connecting tube 31 closed on both ends thereof by ball and socket joints and a clamp tube 35 attached to the aforementioned connecting tube by one of said ball and socket joints and, in turn, affixed to the supply valve pintle 20. The structure of the above patent further includes separate fluid duct means for relieving excess pressure at the downstream end of the system, these fluid duct means being referred to as jet tube 19. According to the instant invention a single part is substituted for the above mechanical tie means and the above jet tube, thus performing both the mechanical functions of said tie means and the fluid flow conduction function of said jet tube.

SUMMARY OF THE INVENTION

A pressure regulator according to this invention includes a valve body defining a supply passage, an outflow passage, a supply valve seat intermediate said supply passage and said outflow passage and a control chamber communicating with said outflow passage by a restricted passageway. The pressure regulator further includes biased movable partition means bounding said control chamber on one side thereof and supporting an annular relief valve seat member and a relief-chamber-defining partition forming a relief chamber inside of and separate from said control chamber. The regulator further includes a seal supported by the valve body thereof separating said supply passage and said outflow passage from said control chamber and biasing means capable of exerting a bias opposite to the bias acting upon said movable partition means. In addition to the above a pressure regulator embodying this invention includes a substantially tubular member arranged coaxially to said relief valve seat member, acted upon by said biasing means and loosely projecting through said seal and through said relief-chamber-defining partition. Said tubular member is closed on one end thereof adjacent said relief valve seat member and forms a relief valve pintle cooperating with said relief valve seat member to form annular gaps of varying width upon relative movements between said relief valve seat member and said tubular member in a direction longitudinally of said tubular member. The aforementioned tubular member defines at least one substantially radially extending perforation forming an orifice from the inside of said tubular member to the aforementioned relief chamber, and the aforementioned tubular member defines at least one substantially radially extending perforation forming an orifice from the aforementioned outflow passage to the inside of said tubular member. This establishes a passageway for the flow of fluid from the aforementioned outflow passage to the aforementioned relief valve chamber. Said tubular member has adjacent the end thereof remote from said relief valve seat member a collar protruding radially outwardly from said tubular member and forming a supply valve pintle arranged to cooperate with said supply valve seat defined by said valve body.

BRIEF DESCRIPTION OF THE DRAWINGS

FIG. 1 is a vertical section of a pressure regulator embodying this invention showing the constituent parts thereof in pressure-relief position;

FIG. 2 shows the same structure as FIG. 1 in the same fashion as FIG. 1 but with the constituent parts thereof in fluid supply position rather than in pressure-relief position; and FIG. 3 is a vertical section of the pressure relief pintle and the fluid supply pintle of the structure of FIGS. 1 and 2 and of the means by which these two parts are tied together.

DESCRIPTION OF PREFERRED EMBODIMENT

Referring now to the drawings, the valve body 1 defines a supply passage 17 and an outflow passage 16 for a fluid or gaseous medium. Pipe line 22 screw-threaded to valve body 1 supplies fluid to the same whose pressure varies, and pipe line 23 screw-threaded to valve body 1 derives fluid from valve body 1 whose pressure is constant and has a predetermined level which is generally lower than the pressure level of fluid admitted by pipe line 22 to supply passage 17. Valve body 1 further defines an annular or circular supply valve set 20 intermediate supply passage 17 and outflow passage 16. The partition 21 of valve body 1 separates supply passage 17 and outflow passage 16 from a control chamber 1a defined by valve body 1. Outflow passage 16 communicates with control chamber 1a by a restricted passageway 18. Control chamber 1a is bounded at the upper side thereof by spring biased movable partition means including piston 6 and flexible diaphragm 8. The outer periphery of the latter is clamped between valve body 1 and bonnet or valve top 2 by means of bonnet screws 19. The right side of bonnet 2 is provided with a venting hole 2a. Partition means 6, 8 are biased in downward direction by helical range spring 5 whose lower end abuts against piston 6 and whose upper end abuts against spring supporting plate or spring support 4 acted upon by setscrew or regulating-screw 3 supported in the center of bonnet 2. Piston 6 supports an annular relief valve seat member 7 arranged in the center of piston 6 and projecting through a central perforation in the latter. Piston 6 further support a cup-shaped partition 9 which defines a relief chamber 9a inside of, and separate from, control chamber 1a. A seal 15 supported by partition 21 of valve body 1 separates the supply passage 17 and the outflow passage 16 from control chamber 1a. The bottom of valve body 1 is closed by a screw-threaded bottom plug 13 supporting a flexible diaphragm 11 and defining jointly with the latter a chamber 13a. Spring 14 inside bottom plug 13 is a means capable of exerting an upward bias opposite to the downward bias exerted by spring 5 upon piston 6 and flexible membrane 8. If desired diaphragm 11 may be proportioned to exert a bias opposite to that of spring 5. A substantially tubular member 10 is arranged inside of casing 1 in coaxial relation to relief valve seat member 7 and projects loosely through a center perforation in seal 15 and a center perforation in partition 9, both perforations having an i.d. substantially equal to, but slightly larger than, the o.d. of tubular member 10. The upper end of tubular member 10, i.e. the end thereof adjacent relief valve member 7 is closed and forms a conical relief valve pintle cooperating with relief valve seat member 7 to form annular gaps of varying width upon relative movements between relief seat member 7 and tubular member 10 in a direction longitudinally of the latter. Tubular member 10 defines at least one substantially radially extending perforation 10b forming an orifice from the inside of tubular member 10 to relief chamber 9a. Preferably a plurality of such perforations are provided, as clearly shown in FIGS. 1—3. Tubular member 10 further defines at least one substantially radially extending perforation 10c forming an orifice from outflow passage 16 to the inside of tubular member 10. Preferably a plurality of such perforations 10c are provided as clearly shown in FIGS. 1—3. Thus a direct passageway for a flow of fluid reducing the pressure in outflow passage 16 is provided. This venting passageway extends from outflow passage 16 through orifices 10c, the inside of tubular member 10, orifices 10b, relief chamber 9a, the gap formed between the closed conical end portion 10a of tubular member 10, relief valve seat member 7, the space bounded by bonnet 2 and venting hole 2a in bonnet 2 to the outer atmosphere. Tubular member 10 has adjacent the end remote from relief valve seat member 7, i.e. adjacent its lower end, a collar 10d protruding radially outwardly from tubular member 10 and forming a supply valve pintle having an annular surface arranged to cooperate with the annular supply valve i.e. 20 defined by valve body 1. Tubular member 10 extends below its supply-valve-pintle-forming collar 10d and supports on the outer surface thereof a ring 12 clamping the radially inner side of flexible diaphragm 11 against a shoulder defined by collar 10d and tubular member 10. The lower end of tubular member 10 defines a coaxial opening 10e situated below flexible diaphragm 11 inside of chamber 13a. Helical resetting spring 14 rests with the upper end thereof against clamping ring 12 and thus tends to bias tubular member 10 in upward direction, i.e. in a direction opposite to the bias exerted by spring 5 and relief valve seat member 7 upon tubular member 10 (See FIG. 2).

Partition 21 of valve body 1 defines an annular groove 21' for receiving the outer periphery of disk-shaped circular seal 15.

The cup-shaped partition 9 defining relief chamber 9a has an annular supporting lip 9b clamped between a radially outwardly extending flange 7b formed by part 7 and piston 6 and flexible membrane 8, respectively.

It will be apparent from FIGS. 1 and 2 that perforations 10b in tubular member 10 are arranged more remotely from relief valve seat member 7 than the closed cone-shaped end 10a of tubular member 10.

Tubular member 10 and its supply-valve-pintle-forming collar 10d may be formed by two separate parts integrated into a structural unit. Preferably member 10 and collar 10d are constituted by a single unitary part as shown in FIG. 3.

The desired downstream pressure at 16 and 1a, respectively, is set by rotating screw 3 and thus increasing or decreasing, as the case may be, the bias of spring 5 upon cylinder 6 and annular relief valve seat member 7. Whenever the pressure within control chamber 1a upon flexible membrane 8 and piston 6 exceeds the downward bias of spring 5 upon piston 6, piston 6 and annular relief valve member 7 are moved upwardly in the direction of arrow R of FIG. 1, thus establishing an annular gap between parts 7 and 10a. This allows venting of outflow passage 16 through orifices 10c, the inside of tubular member 10, orifices 10b, relief chamber 9a, relief valve seat member 7 and venting passage or venting hole 2a. This venting or relief flow lasts until the downstream pressure in control chamber 1a and in outflow passage 16 are reduced to the required, or desired, level. At this point there is equilibrium between the pressure exerted upon piston 6 and annular relief valve member 7 in upward direction and in downward direction. When this equilibrium condition is established the upper closed end 10a of tubular member 10 plugs the central orifice defined by relief valve seat member 7.

Assuming now that the downstream pressure in outflow passage 16 and in chamber 1a are below the required, or desired, level defined by the action of spring 5 upon piston 6. This means that the pressure in control chamber 1a is not exerting a sufficiently high force upon diaphragm 8 and piston 6 to equalize the opposite force of preset range spring 5. As a result, piston 6, relief valve seat member 7, cup-shaped partition member 9 and flexible diaphragm 8 are moved in downward direction, i.e. the direction of arrow S of FIG. 2. Tubular member 10 is likewise moved in downward direction or the direction of arrow S since its upper closed end 10a is engaged by the relief valve seat member 7. Thus supply valve pintle 10d is caused to part from its mating supply valve seat 20 and to allow a flow of fluid from supply passage 17 to outflow passage 16. This flow continues until the downstream pressure in chamber 1a and passage 16 has been raised to the desired level. Then a new equilibrium condition is established between the forces acting in upward direction and acting in downward direction upon piston 6. When this equilibrium condition has been reached piston 6 is in a higher position than that sown in FIG. 2, and has raised with it a corresponding distance all parts integral with it. The movement of piston 6 in a direction opposite to that of arrow S has no immediate effect upon tubular member 10 since the fit between tubular member 10 and partition 9 is but a loose fit. In the equilibrium position of piston 6 the cone-shaped upper end 10a of tubular member just contacts relief valve seat member 7 and supply member pintle 10d just contacts supply valve seat 20 of valve body 1. This calls for a slight upward bias of tubular member 10 to cause the latter to follow the upward movement of piston 6 and the parts integral with the latter in the direction opposite to that of arrow S. Flexible diaphragm 11 may be designed to balance the forces of fluid exerted upon the supply-valve-pintle-forming collar 10d, in which case tubular member 10 is moved in upward direction by the action of biasing or resetting spring 13 only. On the other hand, diaphragm 11 may be dimensioned to overcompensate the downward action of fluid upon collar or supply pintle 10d and to impart a slight upward bias to tubular member 10 which may be added to that of spring 14, or be sufficiently high to dispense altogether with the provision of spring 14.

I claim:

1. A pressure regulator including:
   a. a valve body 1 defining a supply passage 17, an outflow passage 16, a supply valve seat 20 intermediate said supply passage 17 and said outflow passage 16 and a control chamber 1a communicating with said outflow passage 16 by a restricted passageway 18;
   b. biased movable partition means 6,8 bounding said control chamber 1a on one side thereof and supporting an annular relief valve seat member 7 and a relief-chamber-defining partition 9 forming a relief chamber 9a inside of and separate from said control chamber 1a;
   c. a seal 15 supported by said valve body 1 separating said supply passage 17 and said outflow passage 16 from said control chamber 1a;
   d. biasing means 11,14 capable of exerting a bias opposite to the bias acting upon said movable partition means 6,8; and
   e. a substantially tubular member 10 arranged coaxially to said relief valve seat member 7, acted upon by said biasing means 11,14 and loosely projecting through said seal 15, said tubular member 10 being closed on one end 10a thereof adjacent said relief valve seat member 7 and forming a relief valve pintle cooperating with said relief valve seat member 7 to form annular gaps of varying width upon relative movements between said relief valve seat member 7 and said tubular member 10 in a direction longitudinally of said tubular member 10, said tubular member 10 defining at least one substantially radially extending perforation 10b forming an orifice from the inside of said tubular member 10 to said relief chamber 9a and said tubular member 10 defining at least one substantially radially extending perforation 10c forming an orifice from said outflow passage 16 to the inside of said tubular member 10 thus establishing a direct passageway for a flow of fluid from said outflow passage 16 to said relief chamber 9a, said tubular member 10 having adjacent the end thereof remote from said relief valve seat member 7 a collar 10d protruding radially outwardly from said tubular member 10 and forming a supply valve pintle arranged to cooperate with said supply valve seat 20 defined by said valve body 1.

2. A pressure regulator as specified in claim 1 including:
   a. a hollow bottom plug 13 engaging and affixed to said valve body 1 arranged in coaxial relation to said tubular member 10 and defining a plug chamber 13a;
   b. a flexible diaphragm 11 subdividing said plug chamber 13a into a first portion adjacent said supply-pintle-forming collar 10d of said tubular member 10 and into a second portion remote from said supply-pintle-forming collar 10d of said tubular member 10; and
   c. said tubular member 10 having a coaxial opening 10e at the end thereof opposite said closed relief-valve-pintle-forming end 10a thereof, said coaxial opening 10e being located in said second portion of said plug chamber 13a.

3. A pressure regulator as specified in claim 2 wherein a helical resetting spring 14 is interposed between the inner surface of said bottom plug 13 and the end of said tubular member 10 having said coaxial opening 10e.

4. A pressure regulator as specified in claim 1 including:
   a. a hollow bottom plug 13 screwed into said valve body 1 arranged in coaxial relation to said tubular member 10 and defining a plug chamber 13a;
   b. a flexible diaphragm 11 subdividing said chamber into a first axially inner portion and a second axially outer portion; and
   c. said tubular member 10 being adapted to establish a communication for the flow of fluid through said tubular member 10 into said second axially outer portion of said plug chamber 13a.

5. A pressure regulator as specified in claim 1 wherein said valve body 1 includes a partition 21 separating said control chamber 1a from said supply passage 17 and from said outflow passage 16, said partition 21 defining an annular groove 21' for said seal 15, said seal 15 being substantially in the shape of a disk engaging said annular groove 21' at the outer periphery thereof and having a central aperture for the passage of said tubular member 10.

6. A pressure regulator as specified in claim 1 wherein:
   a. said biased movable partition means 6,8 includes a piston 6 having a central aperture;
   b. said annular relief valve seat member 7 projects through said central aperture of said piston 6 and has a downstream venting orifice situated to one side of said piston 6 and an upstream orifice into which said closed end 10a of said tubular member 10 projects; and wherein
   c. said relief-chamber-defining partition 9 is substantially cup-shaped and has a supporting lip 9b interposed between said piston 6 and a portion of said relief valve seat member 7 projecting through said central aperture of said piston 6 and forming a flange 7b extending radially outwardly from said central aperture.

7. A pressure regulator as specified in claim 1 wherein said tubular member 10 is substantially cone-shaped at said closed end 10a thereof.

8. A pressure regulator as specified in claim 7 wherein said radial perforation 10b of said tubular member 10 adjacent said one end 10a thereof is arranged more remotely from said annular relief valve seat member 7 than said substantially cone-shaped closed end 10a of said tubular member 10.

9. A pressure regulator as specified in claim 1 wherein said tubular member 10 defines a plurality of substantially radially extending perforations 10b adjacent said one end 10a thereof, and wherein said tubular member 10 defines a plurality of substantially radially extending perforations 10c adjacent the end thereof opposite said one end 10a thereof.

10. A pressure regulator as specified in claim 1 wherein said tubular member 10 and said radially outwardly protruding collar 10a thereof are constituted by one single unitary part.